US008233178B2

(12) United States Patent
Robinson et al.

(10) Patent No.: US 8,233,178 B2
(45) Date of Patent: Jul. 31, 2012

(54) PRINT DEVICE SELECTION IN A NETWORKED PRINT JOB ENVIRONMENT

(75) Inventors: David C. Robinson, Penfield, NY (US); Michael E. Farrell, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 951 days.

(21) Appl. No.: 12/134,513

(22) Filed: Jun. 6, 2008

(65) Prior Publication Data

US 2009/0303502 A1 Dec. 10, 2009

(51) Int. Cl.
*G06F 3/12* (2006.01)
*G06K 1/00* (2006.01)
*G06Q 10/00* (2012.01)
*H04N 1/00* (2006.01)

(52) U.S. Cl. .... 358/1.15; 358/1.2; 358/1.9; 358/426.02; 705/7.25; 705/7.41

(58) Field of Classification Search .................. 358/1.2, 358/1.9, 1.13, 1.14, 1.15, 1.18, 426.02; 705/7.25, 705/7.41

See application file for complete search history.

(56) References Cited

U.S. PATENT DOCUMENTS

| 7,352,491 | B2 | 4/2008 | Bala et al. |
| 2003/0231329 | A1 | 12/2003 | Edmonds et al. |
| 2004/0008366 | A1* | 1/2004 | Ferlitsch ............ 358/1.15 |
| 2005/0036159 | A1 | 2/2005 | Sharma et al. |

OTHER PUBLICATIONS

U.S. Appl. No. 12/016,397, filed Jan. 18, 2008, Osadciw, et al.

* cited by examiner

*Primary Examiner* — Thomas Lett
(74) *Attorney, Agent, or Firm* — Philip E. Blair; Fleit Gibbons Gutman Bongini & Bianco P.L.

(57) ABSTRACT

What is disclosed is a novel system and method for selecting a printer in a document reproduction environment comprising a plurality of networked printing devices. In one embodiment, a document is received which is to be printed and a set of image quality requirements specific for the document are determined based on the document's image content. A threshold quality expectation level is set for the document based on the set of image quality requirements. Device specific image quality metrics are obtained for each of the networked printing devices and then compared with the threshold quality expectation level. A printing device which best exceeds the threshold quality expectation level is selected as a result of the comparison. The document is sent to the selected networked printing device. If none of the networked printing devices is found to meet the threshold then an operator is signaled that the document cannot be printed.

17 Claims, 5 Drawing Sheets

PRINT DEVICE SELECTION IN A NETWORKED PRINT JOB ENVIRONMENT

TECHNICAL FIELD

The present invention is directed to systems and method for selecting a printing device from among a plurality of networked printing devices.

BACKGROUND

As digital color copying/printing increasingly becomes a commodity, print shop operators and other print/copy providers have sought to determine ways to grow revenue and reduce costs. One way to increase revenue is to perform print/copy jobs having high fidelity color requirements. A print provider can usually charge more for a high fidelity color print job because of enhanced color rendition.

In digital color publishing applications, it is often desirable to distribute the rendering of a job on multiple devices which may or may not be physically co-located. For example, in cluster printing a color job might be split among multiple co-located printers in order to meet deadlines, reduce cost, or optimize overall print shop capacity. Distributed printing from a centralized repository close to the final site of delivery is another scenario where rendering is split among multiple printers; which are not physically co-located. It often is important that color reproduction amongst separate devices be highly consistent as color characteristics vary across marking devices and device controllers. Proper color management is thus needed to ensure color consistency.

Image quality sensitive print applications such as photo books or product collaterals typically have the greatest image quality demands while variable data work exemplified by promotional transaction print applications typically require only moderate image quality requirements. Currently there are few automated tools to assist print/copy job personnel in selecting the most appropriate production printer for image quality sensitive print jobs in a document reproduction environment.

Automated selection of production printer for characteristics other than image quality is available in output management and load balancing products such as Free Flow Output Manager (FFOM) which provides printer selection based on job programming attributes.

Printer selection based on image quality requirements is often a manual task performed by production personnel familiar with the image quality document reproduction characteristics of the printers and the image quality requirements of the various documents of the print job. Selection of the appropriate printer can be based on color attributes or the type of color determined for the job. Once the type of color has been determined, the color characteristics can be matched with available devices for the print job. One device is selected and the color document is rendered onto the selected device. Such a method is disclosed in US 2005/0036159 entitled: "System and method for obtaining color consistency for a color print job across multiple output devices", assigned to Xerox. In another method, the types of color data are determined by a mix of defined colorimetry and undefined colorimetry in the color document and alternatively by analyzing the color spaces in the document and the embedded profiles, as disclosed in U.S. Pat. No. 7,352,491 entitled "System and method for selecting the best set of devices for rendering color documents", assigned to Xerox.

What is needed in this art are increasingly sophisticated systems and methods for selecting the most appropriate printer for image quality sensitive prints from among a plurality of printing devices in a print job environment.

BRIEF SUMMARY

What is provided are a novel system, method, and computer program product for selecting a print device from among a plurality of printing devices.

In one example embodiment, a document or a page of a document is received. A set of image quality requirements specific for the document to be printed are determined based on the content of the document. Additional image quality requirements can be specified by the customer, an operator, a print program, and/or a job application, and then included with the set of quality requirements. A threshold quality expectation level is set for the document based on the set of image quality requirements. Device specific image quality reproduction metrics are obtained for each of the available networked printing devices from either querying the individual print devices for their individual metrics or from information retrieved from a local or networked storage device. The device specific image quality reproduction metrics are then compared against the threshold quality expectation level. Based on the results of the comparison, a printing device which matches or exceeds the threshold quality expectation level is selected. The document is then sent to the selected printing device for rendering. If none of the available printing devices are found to meet or exceed the threshold quality expectation let then an operator is signaled that the expectation level set for this document based on the set of image quality requirements cannot be met by any of the available print devices. Other features and enhancements are provided.

Advantageously, any of the document's image quality requirements, threshold quality expectation levels, device specific image quality metrics, comparison results, and information regarding the printing device selected for the received document can be stored in a database for subsequent retrieval and/or analysis.

The foregoing and other features and advantages will be apparent from the following more particular description of the preferred embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for automatically selecting a printer from a plurality of printing devices in a networked document reproduction environment.

It should be understood that one of ordinary skill in this art would be readily familiar with many facets of document reproduction as it pertains to color space, color transformation, gamut mapping, and other related techniques and algorithms common in this art. Additionally, one of ordinary skill would also be knowledgeable about computer science and software and programming systems and methods sufficient to implement the functionality and capabilities described in detail herein in their own hardware environments without undue experimentation.

A "job", as used herein, refers to a logical unit of work that is to be completed for a customer in a print/copy environment. A "print job" and "copy job" refers to a job processed in a print/copy shop on a document production/reproduction device such as a printer, copier, other marking device capable of output an image on a print media such as paper, transparencies, and the like. Example print jobs include a page, an image, a multi-page document, a brochure, photo, film, and the like, which a customer desires to have reproduced with a high quality.

A "print device" and "copy device" refers to a device that is capable of receiving commands, printing/copying text, graphics, images, and the like, onto a media substrate such as paper, and include production printers, xerographic devices, facsimile machines and/or other document reproduction devices typically found in a print job/copy job environment. Such devices typically incorporate a scanner capable of digitizing a document.

"Printing technology" refers to a set of inks or toners available to a printing device for printing a print job. "High fidelity printing technology" refers to a printing technology having a set of inks or toners having more than 4 colors, such as CMYKO. An example high fidelity printing technology is Pantone's Hexachrome System, which adds orange and green to the colors CMYK.

The term "system setting" or "configuration settings" means any system or subsystem setting applicable to a print engine which are associated with properties or attributes of a given paper stock, and which are used by the print engine to optimize performance. Further, the term "media", as used herein, refers to a set of attributes which includes color, weight, thickness, coating options, finish, and white point. The term "stock", as used herein, refers to a specific instance of a media and includes attributes such as size, grain direction, drilled, type, and ordered stock modulus. A single media can have many stocks associated with it but any given stock belongs to only a single media. In addition to those attributes relating to the physical substrate, media also includes data on how stocks are to be processed by the print engine.

A "gamut" or "color gamut" refers to a set of colors that can be produced by a printing device or via a display device. A gamut or color gamut can alternatively refer to a subset of colors that are present in a print job or a portion of a print job such as, for example, a section, a page, an image, an object, or the like. A "color profile" refers to a relationship between a color space and a color standard known in this art. A color profile may be used to transform a color space for a print job, printing device (based on a particular printing technology) or display device into, for example, a standardized color space, or vice versa. A color profile may include a "source color profile" which translates a color space to a standardized color space, a "destination color profile" which translates the standardized color space to the color space, or both. The standardized color space may be the color space defined by the International Color Consortium (ICC). A "color gamut error profile" refers to a destination color profile that identifies a vector and/or a scalar value for each color in a color space corresponding to an amount by which the color is out-of-gamut for a corresponding printing device, display device, or printing technology. "Out-of-gamut" refers to a condition in which a color in a print job cannot be accurately represented using a printing device or a printing technology; that is, the color falls outside the subset of colors that the printing device or the printing technology can produce.

"Color transformation" refers to the process of translating a print job or a portion thereof that is represented in an input color space to an output color space. In conventional color management systems, a color transformation converts each input color space for a print job, on a color by color basis, into an output color space using mathematical algorithms represented by multiple color profiles: a first color profile converts an input color space to a standardized color space, and a second color profile converts the standardized color space to an output color space. The second color profile may be replaced with a color gamut error profile which converts the standardized color space to a scalar value or a vector representing an amount by which a color is out-of gamut. The mathematical algorithms of the color profiles for a color transformation may be convolved to produce a single mathematical algorithm to increase efficiency.

The terms "document production" and "document reproduction" are used herein interchangeably and are intended to mean the production of new documents such as, for example, printing a book or magazine, and the reproduction of existing documents such as copying a document.

It should be understood that the teachings hereof are equally applicable to a wide range of printer marking devices, technologies, and capabilities, and should not be construed as being limited to process color (CMYK) devices. The present method is directly applicable to monochrome devices, highlight color devices and many other extended gamut devices in addition to CMYK process color devices.

Figure 1:
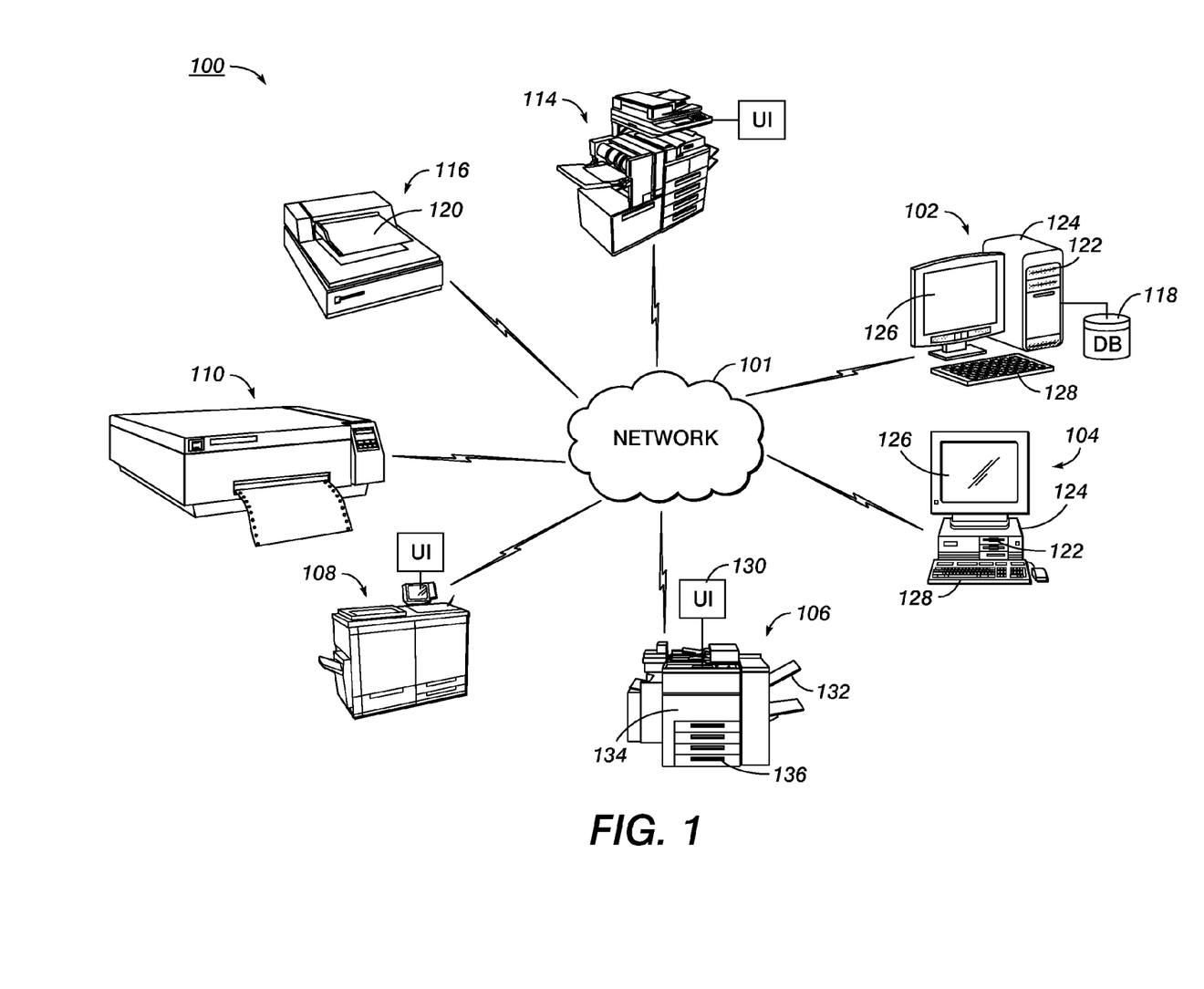
FIG. 1 illustrates one embodiment of a networked environment of computers, printers, and a database in accordance with the present system and method.

Reference is now being made to FIG. 1 which illustrates one embodiment of a networked document reproduction environment 100 shown generally having computer systems connected to various print and copy devices over network 101. Such a networked environment may be wholly incorporated within the confines of a single print/copy center or may be distributed to many different locations depending on the need.

In the embodiment shown, document reproduction environment 100 includes a computer system 102 which functions as a server wherein various embodiments of the present method will likely find their intended uses. Environment 100 further includes a desktop computer system 104, and print/copy devices 106-114 each having different image quality reproduction metrics as will be discussed herein further. The environment of FIG. 1 also includes scanner 116, common in the arts, which is capable of digitizing a document (not shown) which has been placed on scanner platen 120, in a manner well known in the arts.

Many aspects of network 101, illustrated as an amorphous cloud, are commonly known and may include the internet. A further discussion as to the construction and/or operation of the network or the internet itself has been omitted. Suffice it to say, data is transmitted in packets between a networked devices via a plurality of communication links. One device with access to the network can communicate with another device with access to the network using established protocols. Data is transferred in the form of signals which may be, for example, electronic, electromagnetic, optical, or other signals. These signals are provided to a communications device such as a server, which transmits and receives data packets by means of wire, cable, fiber optic, phone line, cellular link, RF, satellite, or any other medium or communications link known in the arts.

The computers 102-104 and devices 106-116 of document reproduction environment 100 each includes a network interface card (not shown) which facilitates the transmission of data over network 101. Computer system 102 is in communication with each of the other devices 104-116 over network 101. One or more of the other devices of the document reproduction environment may also be capable of communicating with one or more of the other devices in the networked environment depending on the desired configuration of the end-user hereof.

In one embodiment hereof, computer server 102 is capable of receiving the document to be printed from either scanning device 116, print/copy devices 106-116, or desktop computer system 104 over network 101. Computer system 102 further makes the determinations, as discussed herein further with respect to the flow diagram of FIG. 2, and sends the document to be printed/copied to the most appropriate output device, which is one of devices 106-114.

Computer systems 102-104 include at least one processor (discussed with reference to FIGS. 3 and 4) capable of executing machine readable program instructions. The various print/copy/scan devices of the document reproduction environment may also include processors capable of executing program instructions incorporating one or more aspects and/or feature enhancements of the present method. Computers 102-104 can be any of a desktop, laptop, server, mainframe, or the like, common in the arts. Computer systems 102-104 also each have a hard disk (not shown) contained in computer hardware case 124. The hard disk is capable of reading and writing to storage unit 122 wherein a computer readable medium such as a floppy disk, magnetic tape, optical disk, CD-ROM, DVD, etc., is inserted (or mounted) for loading/reading/storing any various software, programs, files, data, records, and the like. Computing devices 102-104 generally comprise a processor, memory, communications link (as will be discussed herein further), a display device 126 such as a CRT or LCD as a visual display of information and a keyboard 128 for manual data entry. The computer system includes a communications interface which acts as both an input and an output to allow software and data to be transferred to external devices. Examples of a communications interface include a modem, a network interface (such as an Ethernet card), a communications port, a PCMCIA slot and card, etc.

In the embodiment shown, computer system 102 implements database 118 wherein various records are stored, manipulated, and retrieved in response to a query. Although the database 118 is shown as a external device, the database will likely be internal to computer server 102 mounted on the hard disk contained therein. Records stored in database 118 can be retrieved, modified, and updated by computer 102. In an alternative embodiment, any of the networked devices can access/update database 118. It should be clearly understood that the term "record", as used herein with respect to database 118, is intended to mean any data structure containing information which can be indexed, stored, searched, and retrieved by a database engine in response to a query. In sum, a record can be configured though a software construct to contain any fields of information. Such constructs are well known in the database arts.

The database 118 of computer system 102 is one known in the arts capable of indexing a plurality of records, receiving and interpreting a query, and retrieving one or more of the appropriate records in response to the query. The database is also capable of adding new records and updating existing records already stored. Since database construction, optimization, indexing, and record retrieval techniques are well known in the arts, a further discussion as to a specific database implementation is omitted herein. Suffice it to say that one of ordinary skill would be able to store, index, and retrieve a matching record containing one or more system settings and provide the same in response to a query over a network such as the internet.

Document reproduction devices 106-114 generally encompasses any document reproduction apparatus including a digital copier, bookmaking machine, facsimile device, xerographic, or any other multi-function image reproduction device capable of performing a print job/copy job function for any purpose. Print/copy devices 106, 108, and 114 include a user interface (UI) 130 through which additional print/copy job instructions may be manually entered by a user/operator into a data processing control system associated with that particular print/copy device. The user interface 130 can be any conventional user interface found in the arts and may include data entry devices such as a keyboard, numeric pad, and/or a mouse. In one embodiment, the user interface comprises a touchscreen display. Print/copy devices 106, 108, and 114 include a paper tray 132, a processing control unit (shown generally at 134), and one or more paper trays 136 for retaining a variety of print media/stock. One or more of the print/copy devices 106, 108, and 114 further incorporates various features, capabilities, and functionality of scanner 116.

Print media (i.e. paper, forms, cards, transparencies, etc.) can be defined by a set of attributes such as type, size, color, weight, etc. Print media can be further defined by type, size, color, weight, etc. For example, the print media (A4 paper) has the following attributes: type-plain; size-21.0 cm×29.7 cm; color-white; weight-90 gsm. Accordingly, the term "attribute" as used herein encompasses any type of characteristic such as type, size, color, weight, etc., by which print media may be identified. The term is intended to encompass any characteristic by which specific values for print media attributes may be differentiated. It should be appreciated that an attribute associated with a print media encompasses any set or subset of values used to identify and differentiate various print media based on one or more characteristics of that attribute. For example, a print media "type" attribute can be any of: plain, lightweight, recycled, mylar, etc. Similarly, a print media "size" attribute can be any of: letter, legal, executive, A4, A5, A6, etc. A print media "color" attribute can be any of: blue, green, etc. Values such as: lb, gsm, etc., can be associated with a print media "weight" attribute.

Many complex document reproduction devices have the ability to configure internal pathways to, for example, transport a certain type of print media having a particular size or orientation. As such, one skilled in this art would readily appreciate that various device components internal to a particular document reproduction system can be changed, modified, or otherwise configured by the device's internal controller processor (shown generally at 134) based on one or more of the attributes of the print media selected for the print/copy job being performed. Other internal components can be configured to, for example, adjust the amount of toner to be applied to a particular print media surface. Other components can be configured to, for example, change a temperature at which a toner is fused onto a surface of a particular type of print media. Sophisticated complex systems have many such components capable of being configured to one or more system settings based on print media attributes entered or otherwise selected by a user/operator. In print system devices, such as devices 106, 108, and 114, the operator may manually enter or change one or more of a device's configuration settings through user interface 130 to ensure optimal device performance and job quality for a given selected print media desired for that print job.

A display on the print/copy device, which is of course one of many possible displays retained in a memory associated with user interface 130, includes device-specific program instructions for instructing the processor control unit 134 to configure the print/copy device based on the attributes entered for the print media loaded in a selected paper tray 136. The user interface includes controls for programming a range of values for the attributes for the various types of print media, allowing the print media loaded in a paper tray to be utilized for a variety of print jobs, where the jobs require different types of media for optimal results. The user interface includes controls for programming the specific system settings to configure the print/copy devices based on the entered media attributes.

Any of the networked devices 102-116 may include an Ethernet or similar card to connect to network 101 using, for example, a modem. Typical network interface cards found in the arts also enable one or more of the functionality of, for example, general purpose systems such as POTS (Plain Old Telephone System) and Integrated Services Digital Network (ISDN) and/or special purpose systems such as a Local Area Network (LAN) and Wireless Area Network (WAN) functionality.

Figure 2:
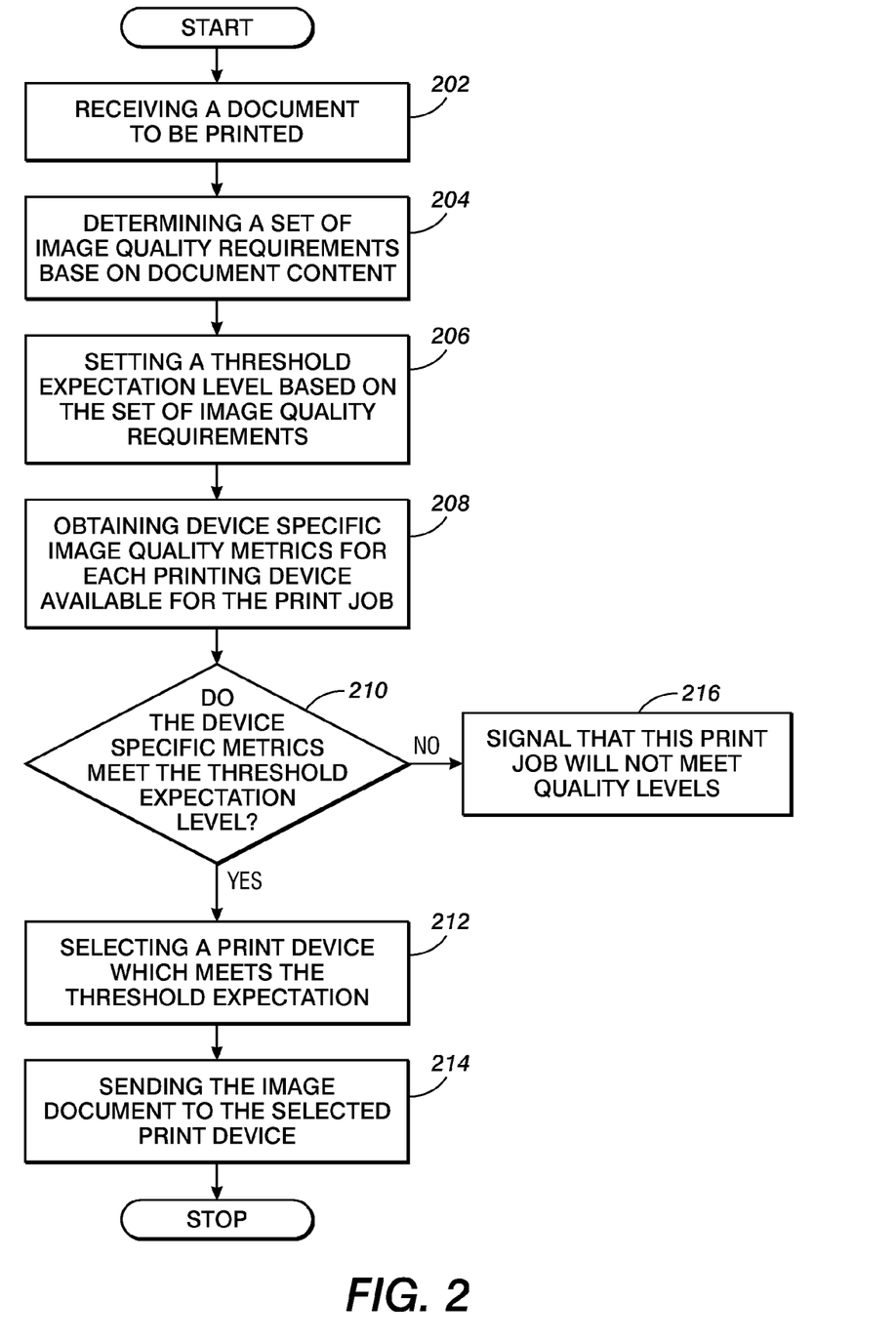
FIG. 2 is a flow diagram of one embodiment of the present method for selecting the most appropriate printer in a networked print job environment.

Reference is now being made to FIG. 2 which is a flow diagram of one embodiment of the present method for selecting a printing device in a networked print job environment.

In one embodiment, at step 202, a document or a page of a document is received. The document is intended to be printed on one of the print device shown in the document reproduction environment 100 of FIG. 1. The document containing image content is received by computer 102 over network 101 from any of the devices 104-116. A scanned document is digitized into a format such as, for example, a PDL format, before being rendered on an output device. Alternatively an image can be rasterized by a process known as rasterization (or alternatively rasterisation). Such a process takes an image described in a vector graphics format and converts it into a raster image (pixels or dots) for output on either a video display device (126 of FIG. 1) or on any of the print/copy devices 106-114. A rasterized image document would have been, in one embodiment, sent to computer system 102 by a graphics program running on computer system 104.

At step 204, a set of image quality requirements specific for the document are determined based on the document's image content. A set of image quality requirements specific for the document to be printed can be determined based on any of the image content contained in the document in a manner known in this art. The set of image quality requirements for the document may include color raster images with high resolution, and color spaces of the received document. Moreover, this may include advanced rendering operators found in the PDL file, e.g. overprint and transparent objects. Information on color spaces, image resolution, and rendering operators is readily available for PDF files through the use of PDF file examination utilities common in the arts. Additional image quality requirements can be further specified for the document on any of the user interfaces 130 by a customer or an operator. The image quality requirements for the print job may also be specified by a print job program and/or a print job application running on any of the print/copy devices 106-113. In many cases, the print purchaser will explicitly or implicitly specify image quality requirements for the specific document. These additional image quality requirements would then be combined with the determined set of quality requirements to produce an overall set of quality requirements specific for the image document of the print job.

Alternatively, the image quality requirements are received by computer system 102 with the received image document after already having been determined by another device. The image quality requirements may be retrieved from a storage device or database 118 based on one or more characteristics of the image content contained in the document, or are otherwise provided by a remote source via network 101.

A PDL file containing one or more images with resolution exceeding 300 dots per inch, content specified using a CMYK color space with one or more spot color callouts, and containing an overprint command or transparent object would have high image quality requirements. In contrast, a PDL file containing all images with resolutions less than 150 dots per inch, all objects in RGB color space and no advanced rendering operators, such as overprint or transparent objects, would have low image quality requirements.

When image quality requirements for the document have not specified or cannot be determined from the received document, or cannot be retrieved from a storage device or a database, or are not otherwise available over a network, image quality requirements for the print job can be determined by evaluating production print job content for specific job elements that are associated with high quality requirements such as, for example, color raster images with high resolution. Spot color references (PANTONE or CMYK) can both be used as indicators that the document print job has been prepared for high quality printing. The image quality requirements for the received document may further be determined by the number of pages contained in the document.

At step 206, a threshold quality expectation level is set for the document based on the set of image quality requirements. The threshold may be as simple as "High" (near-offset press), "Medium" (business color), and "Low" (colorful). Any number of other gradations are possible and are intended to fall within the scope of the appended claims. The threshold can be any value or window of values, or determined by a dynamic algorithm given information retrieved from a historical database about the document or any of the contents thereof. The threshold expectation level can be entered manually by an operator, or retrieved from a storage device or over a network based on one or more characteristics of the image content contained in the document. One skilled in this art would determine for their own document reproduction environment the types and kinds of parameters by which a threshold expectation level as to document reproduction "quality" is to be determined in order meet their customer's respective expectations. PDL's with high, medium, and low image quality requirements can be produced using high quality printers. PDL's with medium and low image quality requirements can be produced using medium quality printers. PDL's with low image quality requirements can be produced using low quality printers.

At step 208, device specific image quality metrics are obtained for each of the networked printing devices from either a querying of the individual print devices or information about any of the print device's image quality reproduction metrics is retrieved from a storage medium locally or over a network. In one example, the device specific image quality metrics for any of the networked print/copy devices comprises any of: an image quality state of the print/copy device; the number of prints since the last developer change; the number of hours on a fuser roll of the printing device; the number of print jobs waiting to be printed on a device; the number of documents to be printed for each print job queued for a device, and the existence of any fault conditions on the print device. Image quality metrics can also be determined based on the gamut capabilities of the output device.

It is well known that document reproduction printing systems are capable of reporting their image quality state via bidirectional protocols such as Internet Printing Protocol (IPP), Job Definition Format (JDF), or Simple Network Management Protocol (SNMP). As such, a further discussion as to receiving/interpreting any of the image quality states of a particular print/copy device has been omitted. Suffice it to say, one skilled in this art would be readily able to obtain the image quality state from any of the print/copy devices 106-114 of the document reproduction environment 100 of FIG. 1.

At step 210, the image quality metrics of each of the devices 106-114 accessible over network 101 are compared to the threshold quality expectation level. For example, if the color gamut of the printer is large (as defined by the number of Pantone colors achievable), the number of prints produced since the last developer change is less than half of the recommended change interval for developer material, and the number of prints produced since the last fuser roll change is less than half of the recommended change interval, then the printer would be considered a high quality printer. If, on the other hand, the color gamut is limited, the number of prints exceeds the recommended change interval for developer material, or the number of prints exceeds the recommended change interval for the fuser roll the printer is considered low quality.

At step 212, based on the comparison, one of the print devices 106-114 which meets or exceeds the threshold quality expectation level is selected. The present method finds the best fit for the image quality output printer for the job. For example, a job having low image quality requirements will be routed to a low image quality capable printing device. One exception is when the utilization of high image quality printers is low which results in low image quality print jobs sent to high image quality print devices. Printer selection criteria may include additional attributes such as, for example, duplex, multiplex, media, finishing, and the like. Other printer selection criteria may be further taken into account. If none of the networked printing devices is found to meet or exceed the threshold quality expectation then, at 216, an operator is signaled that the document's image quality requirements cannot be met by any of the available printing devices.

At step 214, the image document is then sent on the selected print/copy device by computer system 102 would via network 101 for rendering. Where available, the selected device may further utilize the specified image quality requirements to configure the device specific system configurations settings. Image quality requirements may be specified explicitly via a print job programming or may be specified implicitly via the print job application, e.g. photo book or product collaterals.

In another embodiment hereof, any of the document's image quality requirements, threshold quality expectation levels, device specific image quality metrics, comparison results, and information regarding the printing device selected for the received document are stored in a database for subsequent retrieval and/or analysis. The information stored in a database record can be indexed by any of a wide variety of information fields such as document type, document content, desired expectation levels, device metrics, customer name, and the like. Such information can be made readily retrievable from the database for future print jobs for this same customer or other customers with similar jobs. Historical data can further be later used to set subsequent threshold quality expectation levels for documents containing similar image content. Many features and enhancements are envisioned. For example, such information can be used to facilitate a selection between multiple devices which have been found to meet and/or exceed the threshold quality expectation level or to facilitate a choice between print devices having similar image quality metrics. Print devices selected and other system configuration settings can also be retrieved from the database and used to configure or otherwise adjust the selected print device to ensure optimal output quality. Stored information can be adjusted or otherwise updated based on a visual inspection of the output results, or based on operator experience.

The information can be stored locally on the computer system wherein the present method is implemented. The information stored may additionally contain local device specific print system settings. Although most or all of the information can be stored and accessed over the network from the database, this may not be the most resource efficient method of implementing the present system. A local computer is a better place for storing data. Maintaining the information locally on the computer provides for increased performance while decreasing network traffic. What data is stored locally on the computer, if any, will very likely depend on the system constraints of the computing environment of the end-user hereof. Whatever the implementation as to the allocation of data storage, speed and efficiency should be primary motivators.

Figure 3:
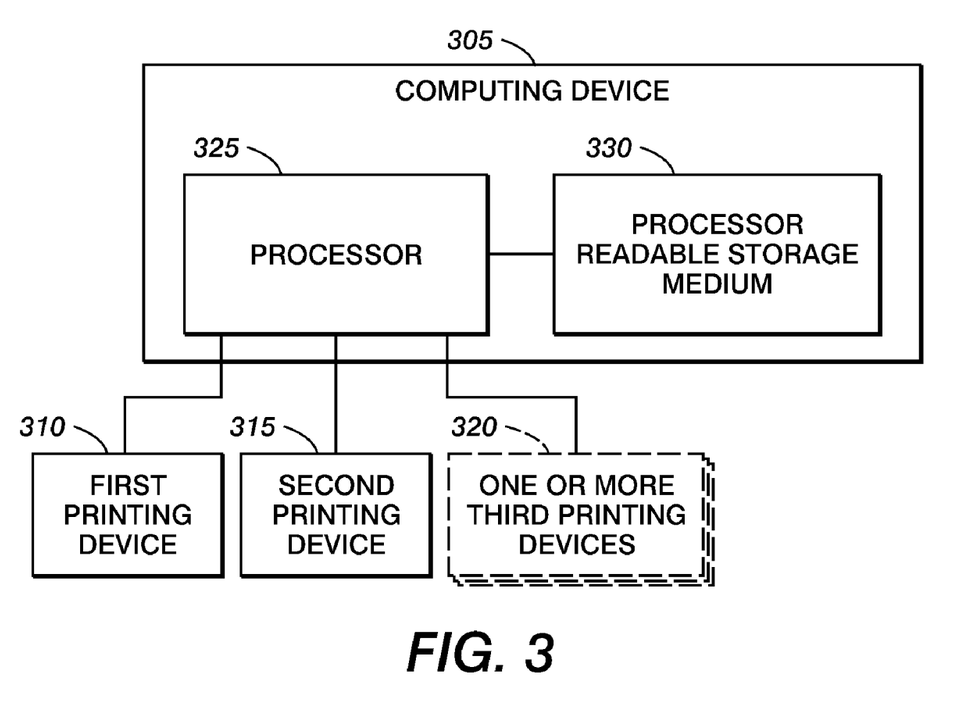
FIG. 3 illustrates a block diagram of one embodiment of a computing system useful for implementing one or more aspects of the present method for selecting a print device as shown in the flow diagram of FIG. 2.

Reference is now made to FIG. 3 which illustrates a block diagram of one embodiment of a system useful for implementing one or more aspects of the present method for selecting a print device as shown in the flow diagram of FIG. 2. As shown, the system includes a computing device 305, a first printing device 310, and a second printing device 315. In an embodiment, the system may further include one or more third printing devices 320. The computing device 305 may include a processor 325 and a processor readable storage medium 330 in communication with the process. The processor 325 is used to perform one or more operations for selecting a print/copy device. The processor readable storage medium 330 includes programming instructions that, when executed by the process, perform operations for selecting a print device according to one or more embodiments of the present method. The processor readable storage medium may further contain image quality metrics for the first printing device 310, the second printing device 315, and the one or more third printing devices 320.

Figure 4:
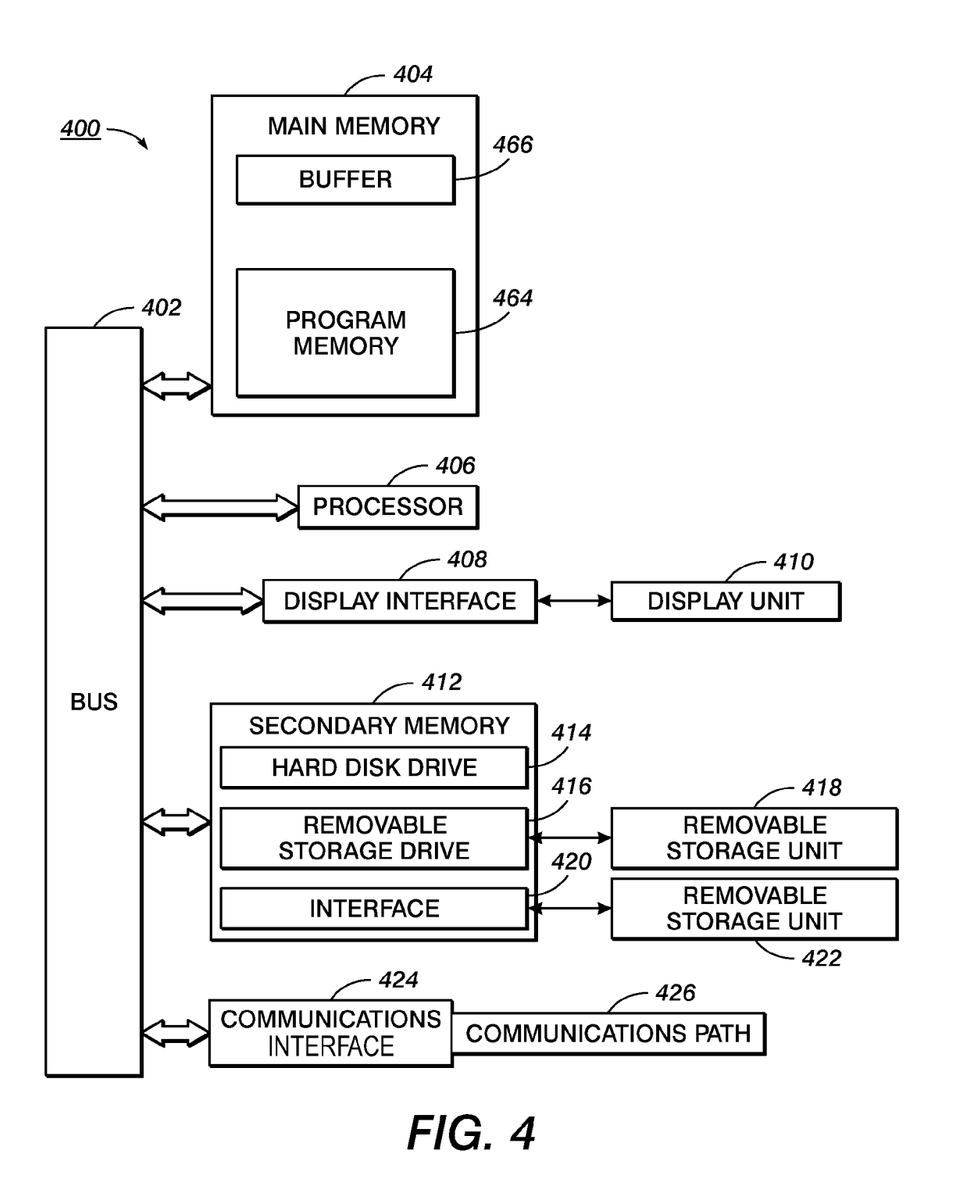
FIG. 4 is a block diagram of one embodiment of a computer system useful for implementing the method illustrated in the flow diagram of FIG. 2.

Reference is now being made to FIG. 4 which illustrates a block diagram of one embodiment of a computer system useful for implementing the method illustrated in the flow diagram of FIG. 2.

The computer system 400 can be a xerographic system, a photocopier, or printing device, and includes one or more processors, such as processor 406 capable of executing machine executable program instructions. The processor is in communication with bus 402 (e.g., a backplane interface bus, cross-over bar, or data network).

The computer system also includes a main memory 404 that is used to store machine readable instructions to be executed by the processor. The main memory is capable of storing data used by or produced by the processor. The main memory may alternatively include random access memory (RAM) to support reprogramming and flexible data storage. Main memory may include buffer 466 to temporarily store data for access by the processor, and a program memory 464 that includes, for example, executable programs that implement the methods described herein. The program memory is capable of storing a subset of the data that is less than all of the data contained in the buffer. Computer system 400 includes a display interface 408 that forwards data from communication bus 402 (or from a frame buffer not shown) to display 410. Computer programs (also called computer control logic) may be stored in main memory and/or secondary memory. Such computer programs, when executed, enable the computer system to perform the features and capabilities provided herein.

The computer system also includes a secondary memory 412. The secondary memory may include, for example, a hard disk drive 414 and/or a removable storage drive 416 which reads and writes to removable storage unit 418, such as a floppy disk, magnetic tape, optical disk, etc., that stores computer software and/or data. Secondary memory 412 may include other similar mechanisms for allowing computer programs or other instructions to be loaded into the computer system. Such mechanisms may include, for example, a removable storage unit 422 adapted to exchange data through interface 420. Examples of such mechanisms include a program cartridge and cartridge interface (such as that found in video game devices), a removable memory chip (such as an EPROM, or PROM) and associated socket, and other removable storage units and interfaces 420 which allow software and data to be transferred from the removable storage unit to the computer system. The computer system 400 includes a communications interface 424 which acts as both an input and an output to allow software and data to be transferred between the computer system and external devices. Examples of a communications interface include a modem, a network interface (such as an Ethernet card), a communications port, a PCMCIA slot and card, etc. Computer programs may also be stored in secondary memory. Such computer programs, when executed, enable the computer system to perform the features and capabilities provided herein.

Software and data transferred via the communications interface are in the form of signals which may be, for example, electronic, electromagnetic, optical, or other signals capable of being received by communications interface 424. Computer programs may also be received via the communications interface 424. These signals are provided to communications interface via a communications path (i.e., channel) 426 which carries signals and may be implemented using wire, cable, fiber optic, phone line, cellular link, RF, or other communications channels.

Figure 5:
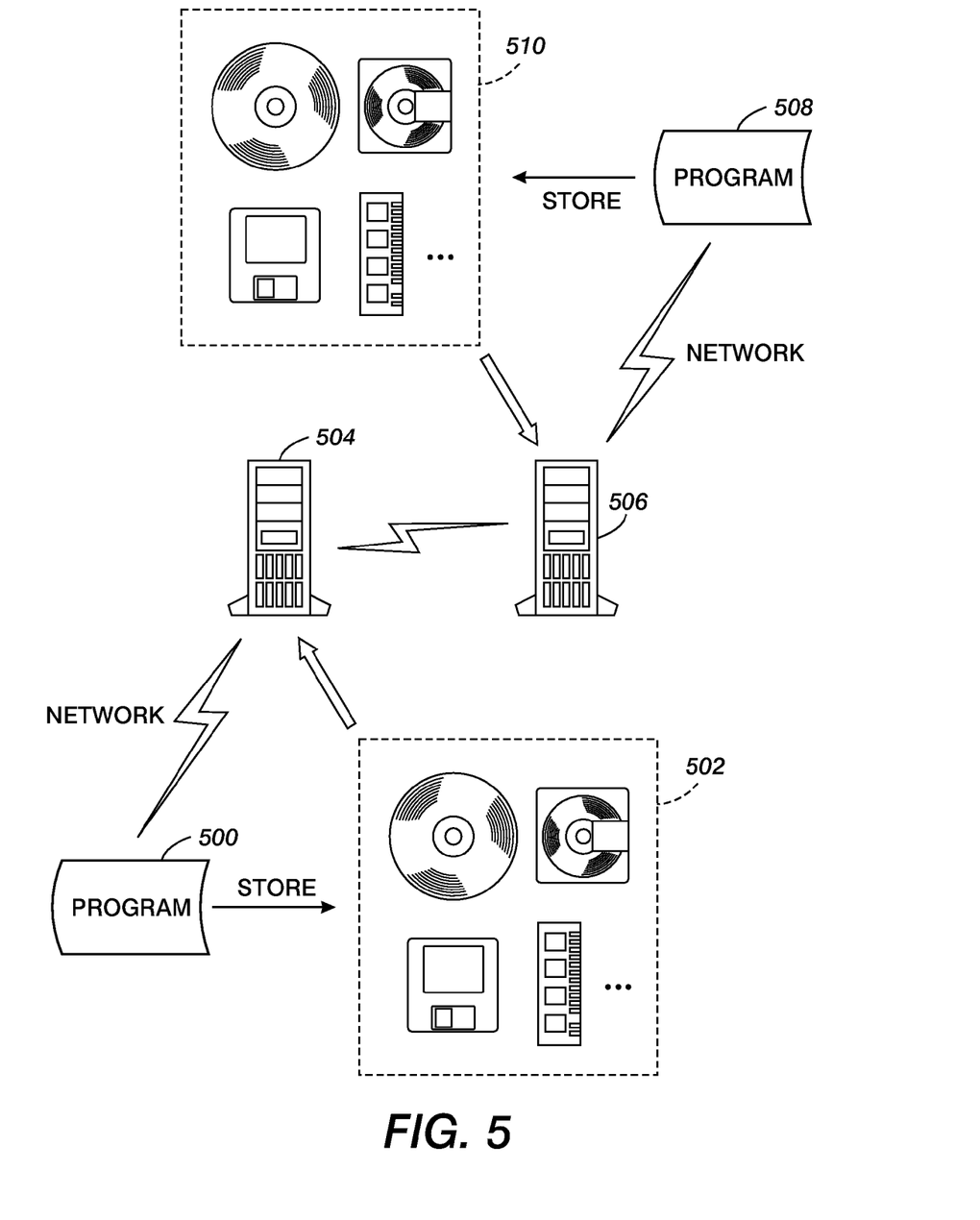
FIG. 5 is an explanatory diagram illustrating one example of a computer storage medium storing machine readable program code containing instructions which cause the computer to execute one or more steps of the present method.

Reference is now being made to FIG. 5 which is an explanatory diagram illustrating one example of a computer storage medium storing machine readable program code containing instructions which, when mounted on computer system, cause the computer to perform one or more steps of the present method. One or more computer program instructions 500 for carrying out the present method are loaded on computer-readable storage media 502 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states in response to program description instructions having been transferred to the media. The storage medium can then be mounted on computer system 504 and transferred or otherwise communicated to computer system 506. The program instructions can then be off-loaded to another program 506, in original form or modified, including data, and stored on storage media 510. Both of the computer systems include processors capable of executing program instructions represented by the flow diagram of FIG. 2.

Terms such as, computer program medium, computer executable medium, computer usable medium, and computer readable medium, are used herein to generally refer to media such as main memory and secondary memory, removable storage drive, a hard disk installed in hard disk drive, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage useful, for example, for transporting information, such as data and computer instructions. The computer readable medium may comprise computer readable information in a transitory state medium such as a network link and/or a network interface, including a wired network or a wireless network, which allows a computer to read such computer readable information.

It should be understood that the flow diagrams depicted herein are illustrative. Other operations, for example, may be added, modified, enhanced, condensed, integrated, or consolidated. Variations thereof are intended to fall within the scope of the appended claims. It should also be understood that the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions. Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. A computer usable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The article of manufacture may be included on at least one storage device readable by a machine architecture or other xerographic or image processing system embodying executable program instructions. The article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for selecting a printer in a networked document reproduction environment, the method comprising:
   receiving a document with a specified number of prints to be printed in a document reproduction environment comprising a plurality of networked printing devices;
   determining a set of image quality requirements specific for said document based on image content of said document;
   setting a threshold quality expectation level for said document based on said determined set of image quality requirements for said document;
   querying an image quality state for each of said networked printing devices including a number of prints produced since at least one of i) a last developer change, and ii) a fuser roller change;
   assigning a device specific image quality metric to each of said networked printing devices based on said image quality state, and in response to said specified number of prints to be printed for said document exceeds a change interval for at least one of said developer and said fuser roller, then assigning a low quality to said device specific image quality metric for said network printing device;
   comparing said obtained device specific image quality metrics with said threshold quality expectation level;
   selecting one of said networked printing devices which best exceeds said threshold quality expectation level based on said comparison; and
   sending said document to said selected networked printing device.

2. The method of claim 1, further comprising:
   specifying image quality requirements for said document by any of a customer, an operator, a print job program, and a print job application; and
   combining said specified image quality requirements with said set of quality requirements determined for said document.

3. The method of claim 1, wherein said set of image quality requirements for said document comprises any of a color raster images with high resolution, color spaces and image resolution of said received document, and a presence of rendering operators.

4. The method of claim 1, wherein one of said networked printing devices is further selected based on any of duplex, colorants media, and finishing attribute.

5. The method of claim 1, wherein said device specific image quality metrics for any of said printing devices further comprises a total number of hours on a fuser roll of said printing device.

6. The method of claim 1, wherein said device specific image quality metrics for any of said printing devices comprises at least one of: a number of print jobs waiting to be printed on said printing device, and a number of documents to be printed for each waiting print job queued for said network printing device.

7. A system for selecting a printer in a networked document reproduction environment, the system comprising:
   a network;
   a plurality of print devices in communication over said network;
   a database capable of storing data records on a storage media; and
   a processor in communication with said database and each of said print device over said network, said processor executing machine readable instructions for performing:
      receiving a document with a specified number of prints to be printed in a document reproduction environment comprising a plurality of networked printing devices;
      determining a set of image quality requirements specific for said document based on image content of said document;
      setting a threshold quality expectation level for said document based on said determined set of image quality requirements for said document;
      querying an image quality state for each of said networked printing devices including a number of prints produced since at least one of i) a last developer change, and ii) a fuser roller change;
      assigning a device specific image quality metric to each of said networked printing devices based on said image quality state, and in response to said specified number of prints to be printed for said document exceeds a change interval for at least one of said developer and said fuser roller, then assigning a low quality to said device specific image quality metric for said network printing device;
      comparing said obtained device specific image quality metrics with said threshold quality expectation level;
      selecting one of said networked printing devices which best exceeds said threshold quality expectation level based on said comparison; and
   sending said document to said selected networked printing device.

8. The system of claim 7, further comprising:
   specifying image quality requirements for said document by any of a customer, an operator, a print job program, and a print job application; and
   combining said specified image quality requirements with said set of quality requirements determined for said document.

9. The system of claim 7, wherein said set of image quality requirements for said document comprises any of a color raster images with high resolution, color spaces and image resolution of said received document, and a presence of rendering operators.

10. The system of claim 7, wherein one of said networked printing devices is further selected based on any of duplex, multiplex, media, and finishing attribute.

11. The system of claim 7, wherein said device specific image quality metrics for any of said printing devices further comprises a total number of hours on a fuser roll of said printing device.

12. The system of claim 7, wherein said device specific image quality metrics for any of said printing devices comprises at least one of: a number of print jobs waiting to be printed on said printing device, and a number of documents to be printed for each waiting print job queued for said network printing device.

13. A computer program product for selecting a printer in a networked document reproduction environment, the computer program product comprising:
 a non-transitory computer readable medium for storing instructions that, when executed on a computer, cause the computer to perform a method comprising:
  receiving a document with a specified number of prints to be printed in a document reproduction environment comprising a plurality of networked printing devices;
  determining a set of image quality requirements specific for said document based on image content of said document;
  setting a threshold quality expectation level for said document based on said determined set of image quality requirements for said document;
  querying an image quality state for each of said networked printing devices including a number of prints produced since at least one of i) a last developer change, and ii) a fuser roller change;
 assigning a device specific image quality metric to each of said networked printing devices based on said image quality state, and in response to said specified number of prints to be printed for said document exceeds a change interval for at least one of said developer and said fuser roller, then assigning a low quality to said device specific image quality metric for said network printing device;
  comparing said obtained device specific image quality metrics with said threshold quality expectation level;
  selecting one of said networked printing devices which best exceeds said threshold quality expectation level based on said comparison; and
  sending said document to said selected networked printing device.

14. The computer program product of claim 13, further comprising:
 specifying image quality requirements for said document by any of a customer, an operator, a print job program, and a print job application; and
 combining said specified image quality requirements with said set of quality requirements determined for said document.

15. The computer program product of claim 13, wherein said set of image quality requirements for said document comprises any of a color raster images with high resolution, color spaces and image resolution of said received document, and a presence of rendering operators, and wherein one of said networked printing devices is further selected based on any of duplex, multiplex, media, and finishing attribute.

16. The computer program product of claim 13, wherein said device specific image quality metrics for any of said printing devices further comprises a total number of hours on a fuser roll of said printing device.

17. The computer program product of claim 13, wherein said device specific image quality metrics for any of said printing devices comprises at least one of: a number of print jobs waiting to be printed on said printing device, and a number of documents to be printed for each waiting print job queued for said network printing device.

* * * * *